May 21, 1957  D. K. HEWITT  2,792,613
PRESS TOOLS FOR THE MANUFACTURE OF TOOTHED
SUPPORTING ARMS IN THE FIRING OF POTTERY
Filed July 19, 1954  2 Sheets-Sheet 1

INVENTOR
DAVID KENNETH HEWITT
BY
ATTORNEY

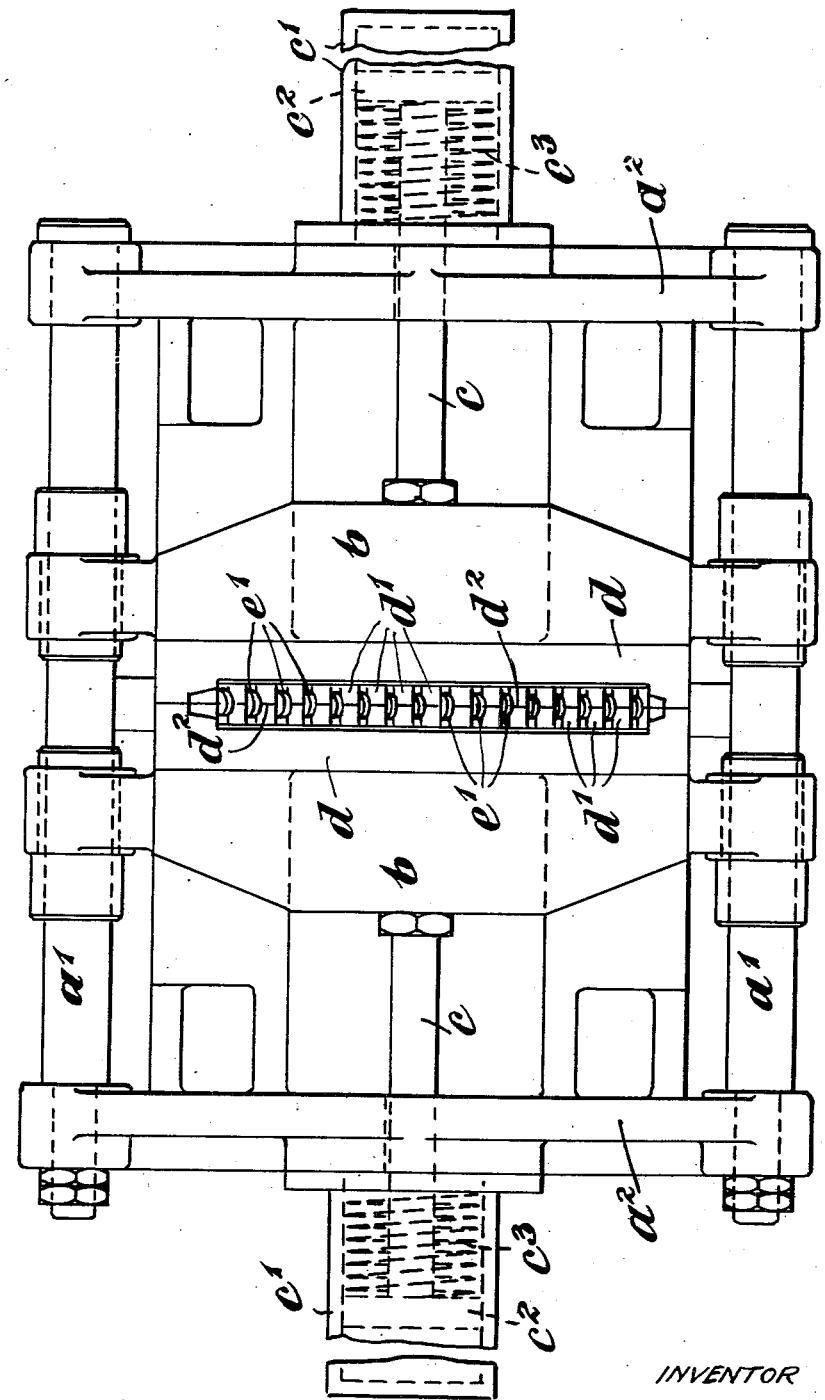

United States Patent Office 2,792,613
Patented May 21, 1957

2,792,613

PRESS TOOLS FOR THE MANUFACTURE OF TOOTHED SUPPORTING ARMS IN THE FIRING OF POTTERY

David Kenneth Hewitt, Trentham, England, assignor to J. Hewitt & Son (Fenton) Limited, Stoke-on-Trent, England, a British company Application July 19, 1954, Serial No. 444,333

1 Claim. (Cl. 25—27)

The present invention has relation to power press tools for the manufacture of toothed supporting arms used in the firing of pottery. Such arms are disclosed in the British patent specifications Nos. 660,893, 680,487 and 695,144 and it is to be noted that these upright arms have flange-like teeth in some instances with cavities and/or projections for the location of studs which come beneath the plates or other pieces being fired, three arms being spaced around a supporting base.

The invention has for its object the expeditious and efficient and accurate manufacture of such stud supporting toothed uprights by power presses.

According to the present invention there is provided press tools for the manufacture of toothed supporting arms used in the firing of pottery comprising in combination a base, two bolsters slidable thereon, dies carried by the bolsters, inserts in the dies, a base die with toothed former protruding between the inserts and a top die.

In order that the invention may be clearly understood and readily carried into practice reference may be had to the appended explanatory drawings in which:

Fig. 2 is a plan view illustrating side pressure dies mounted according to the present invention.

Figure 3:
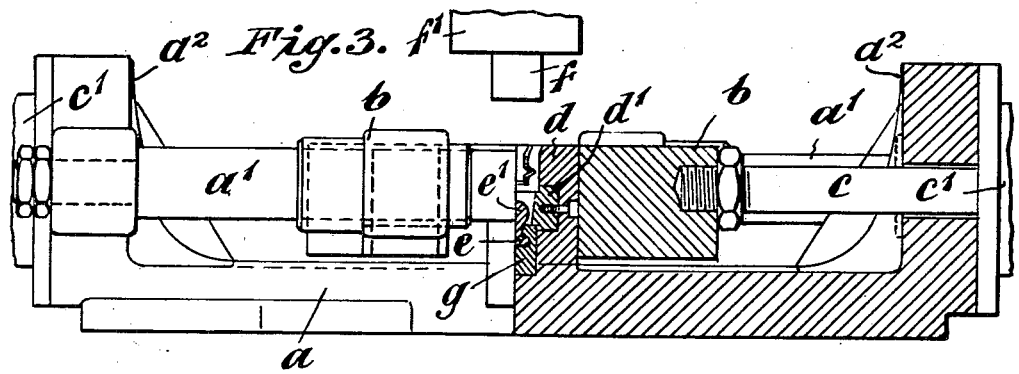
Fig. 3 illustrates the dies and mounting therefor in side and part sectional elevation.
Figure 4:
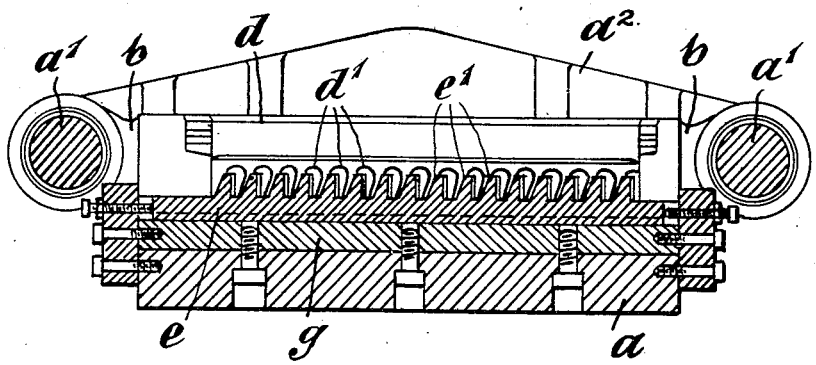
Fig. 4 is a further part sectional elevation showing the interengaging dies.

In the drawings there is shown a rectangular press base $a$ having upwardly directed flanges $a^2$ located adjacent to end edges thereof to form a channel shaped member. Two spaced apart parallel shafts $a^1$—$a^1$ are supported at their ends by said flanges $a^2$ and extend between the flanges a distance above said base $a$ as is shown in Fig. 3. Two bolsters $b$—$b$ are supported upon said shafts for sliding movement between an opened position and a closed position. The bolsters are actuated by means of shafts $c$ cooperating with hydraulic cylinders $c^1$ incorporating rams $c^2$ and having return springs $c^3$. Attached to the bolsters $b$ are die sections $d$ which carry inserts $d^1$ provided with mating surfaces $d^2$. The press base $a$ supports member $g$ to which is fixed former $e$. The former is provided with a plurality of upwardly directed spaced apart teeth $e^1$. The upper die of the press tool is indicated by reference numerals $f$ and $f^1$ shown in Fig. 3.

Upon movement of the bolsters to closed position, mating surfaces $d^2$ contact each other between teeth $e^1$ of the former $e$ in order to provide a mold cavity for the toothed portion of supporting arms heretofore described.

Figure 1:
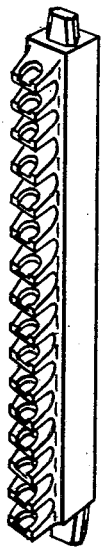
Fig. 1 illustrates a toothed upright for the support of pottery plates the manufacture of which upright is concerned in the present invention.

In this invention the side dies $d$ $d^1$ are hydraulically actuated together and a cylindrical piece of soft fireclay of correct capacity is placed on the former tool and the top die $f$ $f^1$ is actuated so that the clay is forced into the section shown in Fig. 1 and it is to be noticed that the extremities of the side dies $d$ are constituted so that the finished pillar shall have the correct desired terminal extremities. When the dies $d$ are withdrawn the finished pillar may be manipulated away from the teeth of the former $e$ $e^1$.

I claim:

A press tool for the manufacture of toothed supporting arms used in the firing of pottery, comprising in combination, a rectangular base provided with side and end edges, upwardly directed flanges located adjacent to said end edges to form with said base a channel shaped member, two spaced apart parallel shafts extending between the upwardly directed flanges a distance above said base, two bolsters supported upon said shafts for sliding movement between an opened and closed position, a former provided with a plurality of upwardly directed spaced apart teeth supported by said base, a die section carried by each of said bolsters, inserts supported on said die sections provided with mating surfaces which contact each other intermediate said spaced apart teeth upon movement of the bolsters to a closed position, a top die member, and means to move said bolsters on said shafts to position said inserts in mating position intermediate the spaced apart teeth of the former.

References Cited in the file of this patent

UNITED STATES PATENTS

| | | |
|---|---|---|
| 720,718 | Maddock et al. | Feb. 17, 1903 |
| 2,655,708 | Eschenbrenner | Oct. 20, 1953 |